United States Patent [19]

Hirano et al.

[11] Patent Number: 5,807,507
[45] Date of Patent: Sep. 15, 1998

[54] SELF-FUSING CONDUCTIVE SILICONE RUBBER COMPOSITION

[75] Inventors: Tatsuji Hirano; Tomoyuki Okumura; Mitsuhiro Fujimoto, all of Aichi, Japan

[73] Assignee: Fuji Polymer Industries Co., Ltd., Nagoya, Japan

[21] Appl. No.: 915,782

[22] Filed: Aug. 21, 1997

[30] Foreign Application Priority Data

Aug. 28, 1996 [JP] Japan ..................................... 8-226463

[51] Int. Cl.$^6$ ............................... H01B 1/22; H01B 1/24
[52] U.S. Cl. .......................... 252/511; 252/512; 252/513; 252/514; 524/404; 528/13
[58] Field of Search ..................................... 252/502, 511, 252/512, 513, 514; 524/404; 528/13

[56] References Cited

U.S. PATENT DOCUMENTS

| | | | |
|---|---|---|---|
| 4,382,024 | 5/1983 | Seaman et al. | 252/511 |
| 4,777,205 | 10/1988 | La Scola et al. | 524/440 |
| 5,075,038 | 12/1991 | Cole et al. | 252/514 |

Primary Examiner—Mark Kopec
Attorney, Agent, or Firm—Merchant, Gould, Smith, Edell, Welter & Schmidt, P.A.

[57] ABSTRACT

By adding an additive containing boron to a silicone rubber composition, a self-fusing conductive silicone rubber composition is provided, that is easy to use, can be tightly fused without adhesive processing of the tape's surface, can shield electromagnetic waves, prevent static electricity, and is thus very efficient in preventing damages. The silicone rubber composition comprises 100 parts by weight of a high polymerization degree organopolysiloxane, more than 0 but not more than 100 parts by weight of a reinforcement silica powder with a relative surface area of at least 50 m$^2$/g, more than 0 but not more than 100 parts by weight of an increased weight quasi-reinforcement filling agent with a relative surface area of at least 2 m$^2$/g at least one conducting component selected from the group consisting of more than 10 but not more than 150 parts by weight of carbon black and more than 1 but not more than 400 parts by weight of a metal powder, between 0.1 and 10 parts by weight of a platinum catalyst and a crosslinking agent or an organic peroxide and more than 0.1 but not more than 20 parts by weight of an additive, adjusting the proportion of boron and silicon atoms so that there are at least 1.0 boron atoms for 500 silicon atoms and there are not more than 1.0 boron atoms for 100 silicon atoms.

10 Claims, No Drawings

SELF-FUSING CONDUCTIVE SILICONE RUBBER COMPOSITION

FIELD OF THE INVENTION

This invention relates to a thermal vulcanization type self-fusing conductive silicone rubber composition. Furthermore, this invention relates to a thermal vulcanization type silicone rubber composition displaying excellent performance as a shield against electromagnetic waves and in the prevention of damage through static electricity.

BACKGROUND OF THE INVENTION

Tape-shaped parts that are made by weaving tinned copper wires into a tube-shaped web, which is then crushed flat, have excellent corrosion resistance and extensibility, protect bundled wiring, and are used as shields against electromagnetic waves and for the prevention of damage through static electricity. Likewise, parts with metal films (for example aluminium, copper) and conductive cloth as a shield material that are laminated with a resin film (for example polyester or polybutylene terephthalate) and processed into tape shape are similarly used for the above purpose. Likewise, extremely thin monel wire, woven into a tube-shaped web that guides, bundles and protects the wiring within, is used as a shield against electromagnetic waves and for the prevention of damage through static electricity. Likewise, parts that are cut into tape shape after an acrylic or silicone adhesive has been applied to one surface of a metal film such as aluminium or copper and a mold release film has been pasted on, are used to bundle wiring, shield against electromagnetic waves and prevent damage through static electricity.

All of the above cases are used to bundle and protect the wiring, to shield it against electromagnetic waves and to prevent damage through static electricity by wrapping the wiring completely.

However, conventional electronic parts that are used to bundle and protect wiring pose several problems. Tapes that are made by weaving tinned copper wires into a tube-shaped web, which is then crushed flat, have excellent corrosion resistance and extensibility, and by being spirally wrapped around the wiring, such tapes can be used to bundle and protect the wiring, shield against electromagnetic waves, and prevent damage through static electricity. However, not only does the wrapping have to be fixed at the ends and in the middle with another adhesive tape, but the production of such tapes is very complicated and the flexibility and pliability after the bundling drop sharply. Furthermore, a tape that is attained by combining a metal film and a resin film is not suitable for the bundling of wiring. Furthermore, in the case of a sleeve of extremely thin monel wire that is woven into a tube-shaped web for guiding the wiring within, where it is necessary to lay out the wiring after the wires have been passed through the inside of the sleeve before installation, it is quite troublesome to insert the bundled wiring into the sleeve, and the flexibility and pliability after the bundling are rather poor.

Moreover, a shield tape wherein an acrylic or silicone adhesive is applied to one or both surfaces of a metal film can bundle the wiring freely without the difficulties as in the operation of a tube-web-shaped sleeve, and can cover the wiring entirely to shield against electromagnetic waves and to prevent damage through static electricity. However, there is the problem of a considerable loss in flexibility and pliability after construction.

SUMMARY OF THE INVENTION

In order to solve the problems of the prior art, the present invention is directed to providing an easy to use, self-fusing conductive silicone rubber composition that can be tightly fused without adhesive processing of the tape's surface, and that can shield electromagnetic waves, eliminate static electricity, and is very efficient in preventing damage.

In order to reach the above goals, the self-fusing conductive silicone rubber composition comprises at least:

A. 100 parts by weight of a high polymerization degree organopolysiloxane;
B. More than 0 but not more than 100 parts by weight of a reinforcement silica powder with a relative surface area of at least 50 $m^2/g$;
C. More than 0 but not more than 100 parts by weight of an increased weight quasi-reinforcement filling agent with a relative surface area of at least 2 $m^2/g$;
D. At least one conducting component selected from the group consisting of more than 10 but not more than 150 parts by weight of carbon black and more than 1 but not more than 400 parts by weight of a metal powder;
E. Between 0.1 and 10 parts by weight of a platinum catalyst and a crosslinking agent or an organic peroxide; and
F. More than 0.1 but not more than 20 parts by weight of an additive containing boron, wherein the proportion of boron and silicon atoms in the composition is adjusted so that there are at least 1.0 boron atoms for 500 silicon atoms and there are not more than 1.0 boron atoms for 100 silicon atoms.

It is preferable that the self-fusing conductive silicone rubber composition is a self-fusing conductive silicone rubber tape.

In the above composition, it is preferable that the high polymerization degree organopolysiloxane has a molecular weight of about 5000–15000.

Furthermore, it is preferable that the reinforcement silica powder with a relative surface area of at least 50 $m^2/g$ is a silica of the group consisting of aerosol silica, and aerosol silica, whose surface has been processed with various kinds of organosiloxanes and silanes.

Furthermore, it is preferable that the increased weight quasi-reinforcement filling agent with a relative surface area of at least 2 $m^2/g$ is a filling agent from the group consisting of diatomite, quartz powder, titanium oxide or the like.

Furthermore, it is preferable that the platinum catalyst includes at least one compound of the group consisting of siloxane platinate and platinum alcoholate such as ethanol platinate, isopropanol platinate or octatol platinate.

Furthermore, it is preferable that the organic peroxide includes at least one compound of the group consisting of bis-2,4-dichlorobenzoylperoxide, t-butylperbenzoate, di-t-butylbenzoylperoxide, 2,5-dimethyl, 2,5-di-tertiary-butylperoxide and ortho-chloroperbenzoate.

Furthermore, it is preferable that the carbon black includes at least one material of the group consisting of acetylene black, oil furnace black and thermal black.

Furthermore, it is preferable that the metal powder includes at least one powder of the group consisting of silver, nickel, copper, aluminium, stainless steel powder, and powder made conductive by applying metal plating to non-conductive particles.

Furthermore, it is preferable that the additive containing boron includes at least one compound of the group consisting of triethoxy boron ($B(C_2H_5O)_3$) and trialkyl boron ($BR_3$, wherein the R represents an alkyl group with 1–20 carbon atoms).

As has been noted above, a high polymerization degree organopolysiloxane is the main ingredient of the composition according to the present invention. Because the thermal vulcanization type silicone rubber composition of the present invention comprises a platinum catalyst and a crosslinking agent or an organic peroxide, it is possible to adopt a number of molding methods other than the common extrusion molding and injection molding, such as compression molding or transfer molding. Furthermore, because the crosslinking can be performed under high temperature and in a short time, it is possible to produce cast products efficiently by choosing an appropriate casting method. Moreover, because the silicone rubber composition is filled with an additive comprising boron atoms, it is possible to attain excellent silicone rubber cast products having excellent self-fusion after the thermal vulcanization.

Furthermore, because the thermal vulcanization silicone rubber displays excellent fusion after the thermal vulcanization, the silicone rubber can be processed into a tape-shape. If it is then wrapped around bundled electric wiring, it is possible to attain a silicone rubber cast product with excellent performance as a shield against electromagnetic waves and preventing damage through static electricity.

The carbon black and the metal powder are mixed exclusively or jointly into the thermal vulcanization type silicone rubber, and the additive for self-fusion of the silicone rubber after the thermal vulcanization, the platinum catalyst and the crosslinking agent or the organic peroxide are added into the raw material. Thus, with extrusion processing and thermal vulcanization, it is possible to provide a tape-shaped product that can be used as a shield against electromagnetic waves and for the prevention of static electricity when wrapped around bundled wiring.

DETAILED DESCRIPTION OF THE INVENTION

In the present invention, a high polymerization degree organopolysiloxane with a molecular weight of about 5000–15000 can be used. Furthermore, the reinforcement silica powder with a relative surface area of at least 50 $m^2/g$ can be an aerosol silica, or an aerosol silica whose surface has been processed with various kinds of organosiloxanes and silanes. The increased weight quasi-reinforcement filling agent with a relative surface area of at least 2 $m^2/g$ can be diatomite, quartz powder or titanium oxide. Furthermore, the catalytic action that the platinum catalyst shows is an addition reaction, and if the crosslinking agent is a compound comprising hydrogen bonded to silicon, then the crosslinking is performed by this addition reaction and therefore thermal vulcanization can be achieved. Furthermore, the organic peroxide can be at least one compound selected from the group consisting of bis-2,4-dichlorobenzoylperoxide, t-butylperbenzoate, di-t-butylbenzoylperoxide, 2,5-dimethyl, 2,5-di-tertiary-butylperoxide and ortho-chloroperbenzoate. Furthermore, the carbon black can be acetylene black, Ketjenblack (a product of the Lion Corp.), oil furnace black or thermal black. Furthermore, the metal powder can be silver, nickel, copper, aluminium or stainless steel, and non-conducting particles made conductive by applying metal plating or the like can be used also and can be considered as metal powders.

The preferred composition of the present invention is described below:

1. 100 parts by weight of a high polymerization degree organopolysiloxane of about 5000–15000 molecular weight;
2. More than 0 parts by weight but not more than 100 parts by weight of a reinforcement silica powder with a relative surface area of not less than 50 $m^2/g$ such as an aerosol silica, or an aerosol silica, whose surface has been processed with various kinds of organosiloxanes and silanes;
3. More than 0 parts by weight but not more than 100 parts by weight of an increased weight quasi-reinforcement filling agent with a relative surface area of at least 2 $m^2/g$, such as diatomite, quartz powder, or titanium oxide;
4. More than 10 parts by weight but not more than 150 parts by weight of a carbon black such as acetylene black, Ketjenblack, oil furnace black, thermal black or the like;
5. More than 1 part by weight but not more than 400 parts by weight of a metallic powder for metal plating or the like with for example silver, nickel, copper, aluminium, or stainless steel, which is applied to nonconducting parts to improve conductivity and corrosion resistance;
6. More than 0.1 part by weight but not more than 10 parts by weight of a platinum catalyst and a crosslinking agent or an organic peroxide;
7. More than 0.1 but not more than 20 parts by weight of an additive containing boron, wherein the proportion of boron and silicon atoms of the composition is adjusted, so that there are 1.0 boron atoms for 200 silicon atoms.

The above numbers 1–3 describe a silicone rubber composition. Number 6 is an additive that is especially preferable for a thermal vulcanization type silicone rubber. That means, if the platinum catalyst and the crosslinking agent are added simultaneously or the organic peroxide is added exclusively, then vulcanization can be performed at 300° C.–400° C. in about 20 seconds. Here, the platinum catalyst shows catalytic action as an addition reaction, and if the crosslinking agent is a compound comprising hydrogen bonded to silicon, then the crosslinking is performed by this addition reaction and therefore thermal vulcanization can be achieved.

Furthermore, the organic peroxide is at least one compound selected from the group consisting of bis-2,4-dichlorobenzoylperoxide, t-butylperbenzoate, di-t-butylbenzoylperoxide, 2,5-dimethyl, 2,5-di-tertiary-butylperoxide, ortho-chloroperbenzoate and the like.

The carbon black mentioned under number 4 is at least one compound selected according to its conductivity from the group consisting of acetylene black, Ketjenblack, oil furnace black, thermal black and the like.

The metal powder mentioned under number 5 is at least one single metal or metal alloy selected from the group consisting of silver, nickel, copper, aluminium, stainless steel and the like and processed into metal powder, metal flakes or metal fiber.

The boron compound mentioned under number 7 is at least one compound selected from the group consisting of trialkoxyboron such as triethoxyboron and trialkylboron such as triethylboron.

EXAMPLES

Using examples, a concrete explanation is given below. However, the present invention is by no means limited to these examples. In these example, hardness, tensile strength, extensibility and self-fusion force were determined as follows:

(1) Hardness: A JIS-A hardness meter complying with JIS-K-6301 was used.
(2) Tensile strength: A No. 2 dumbbell complying with JIS-K-6301 was used.

(3) Extensibility: A No. 2 dumbbell complying with JIS-K-6301 was used.

(4) Self-fusion force: Two test samples with 0.5 mm thickness, 25 mm width, and 100 mm length were used. After the two samples have been overlapped over a length of about 42 mm, self-fusion was caused by placing a 2 kg load on the samples for 15 min below room temperature (25° C.). Next, portions of the two samples that have not been subject to self-fusion were inserted into a tensile testing meter, and the strength was determined, at the point where the samples exfoliated when pulled apart with a speed of 200 mm/min.

Example 1

A composition has been produced by combining 100 parts by weight of the silicone rubber composition SE6770U manufactured by Toray Dow Corning Corp. with 5.0 parts by weight of a 40% active ingredient dicumyl peroxide as the organic peroxide and 5.0 parts by weight of triethoxy boron ($B(C_2H_5O)_3$). This composition comprises all the components A–F discussed above, that is:

Comp. A: 40 parts by weight of a methylvinyl silicone with a weighted mean molecular weight of 10000;
Comp. B.: 10 parts by weight of an aerosol silica with a relative surface area of 150 $m^2/g$;
Comp. C.: 10 parts by weight of a diatomite with a relative surface area of 20 $m^2/g$;
Comp. D.: 40 parts by weight of acetylene black;
Comp. E.: 2.0 parts by weight of dicumyl peroxide; and
Comp. F.: 5.0 parts by weight of triethoxy boron.

Next, using a 50 mm diameter extrusion molding machine and a hot air vulcanization device, a sample (0.5 mm thick, 25 mm wide and 10 m long) was produced at 300° C. in 5 min. Hardness, tensile strength, extensibility and self-fusion force of the sample are shown in table 1.

Comparative Example 1

As a comparative example, a composition has been produced by combining 100 parts by weight of the silicone composition SE6770U manufactured by Toray Dow Corning Corp. with 5.0 parts by weight of a 40% active ingredient dicumyl peroxide as the organic peroxide. This composition comprises all the components discussed above except component F.

Next, using a 50 mm diameter extrusion forming machine and a hot air vulcanization device, a sample (0.5 mm thick, 25 mm wide and 10 m long) was produced at 300° C. in 5 min. A comparative examination of the self-fusion force of example 1 and comparative example 1 was made. Table 1 shows the collected data.

TABLE 1

|  | Example 1 | Comparative Example 1 |
| --- | --- | --- |
| Hardness | 64 | 65 |
| Tens. Strength | 69 kg/cm$^2$ | 72 kg/cm$^2$ |
| Extensibility | 150% | 140% |
| Self-Fusion Force | 420 g | 10 g |

From the results of the performed measurements, it can be seen that hardness, tensile strength, and extensibility of the rubber composition according to this example of the present invention are almost the same as in the comparative example, whereas the self-fusion force is considerably higher.

Example 2

A composition has been produced by combining 100 parts by weight of the silicone composition SE6770U manufactured by Toray Dow Corning Corp. with 0.1 parts by weight of the platinum catalyst SRX212, 0.4 parts by weight of the hydrogen-containing silicone oil SH1107 as crosslinking agent, 0.03 parts by weight of methylbutynol as inhibitor and 5.0 parts by weight of triethoxy boron ($B(C_2H_5O)_3$). A sample was produced from this composition by the same method as described for example 1. This composition comprises all the components A–F discussed above, that is:

Comp. A: 40 parts by weight of a methylvinyl silicone with a weighted mean molecular weight of 10000;
Comp. B.: 10 parts by weight of an aerosol silica with a relative surface area of 150 $m^2/g$;
Comp. C.: 10 parts by weight of a diatomite with a relative surface area of 20 $m^2/g$;
Comp. D.: 40 parts by weight of acetylene black;
Comp. E.: 0.4 parts by weight of a hydrogen-containing silicone oil, 0.03 parts by weight of methylbutynol, and 0.1 parts by weight of siloxane platinate; and
Comp. F.: 5.0 parts by weight of triethoxy boron.

The collected data is shown in Table 2.

TABLE 2

|  | Example 2 |
| --- | --- |
| Hardness | 69 |
| Tens. Strength | 71 kg/cm$^2$ |
| Extensibility | 120% |
| Self-Fusion Force | 280 g |

From the results of the performed measurements, it can be seen that hardness, tensile strength, extensibility of the rubber composition according to this example of the present invention are almost the same as in the comparative example, whereas the self-fusion force is considerably higher.

According to the rubber composition of the present invention as described above, a self-fusing conductive silicone rubber composition with very high self-fusion force can be provided. Furthermore, a silicone rubber tape produced from this composition has excellent extensibility, can be fused to itself by being spirally wrapped around wiring and can be tightly fused without adhesive processing of the tape's surface. Furthermore, because the silicone rubber material is conducting, the tape displays excellent performance as a shield against electromagnetic waves and prevention of static electricity, and it is thus very effective in the prevention of damage.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A self-fusing conductive silicone rubber composition comprising:

A. 100 parts by weight of a high polymerization degree organopolysiloxane;
B. More than 0 but not more than 100 parts by weight of a reinforcement silica powder with a relative surface area of at least 50 $m^2/g$;
C. More than 0 but not more than 100 parts by weight of an increased weight quasi-reinforcement filling agent with a relative surface area of at least 2 $m^2/g$;
D. At least one conducting component selected from the group consisting of more than 10 but not more than 150 parts by weight of carbon black and more than 1 but not more than 400 parts by weight of a metal powder;
E. Between 0.1 and 10 parts by weight of a platinum catalyst and a crosslinking agent or an organic peroxide; and
F. More than 0.1 but not more than 20 parts by weight of an additive containing boron, the proportion of boron and silicon atoms in the composition is adjusted, so that there are at least 1.0 boron atoms for 500 silicon atoms and there are not more than 1.0 boron atoms for 100 silicon atoms.

2. The self-fusing conductive silicone rubber composition according to claim 1 in a form of a self-fusing conductive silicone rubber tape.

3. The self-fusing conductive silicone rubber composition according to claim 1, wherein the high polymerization degree organopolysiloxane has a molecular weight of 5000–15000.

4. The self-fusing conductive silicone rubber composition according to claim 1, wherein the reinforcement silica powder with a relative surface area of at least 50 $m^2/g$ includes at least one silica of the group consisting of an aerosol silica, and an aerosol silica, whose surface has been processed with various kinds of organosiloxanes and silanes.

5. The self-fusing conductive silicone rubber composition according to claim 1, wherein the increased weight quasi-reinforcement filling agent with a relative surface area of at least 2 $m^2/g$ includes at least one filling agent of the group consisting of diatomite, quartz powder, and titanium oxide.

6. The self-fusing conductive silicone rubber composition according to claim 1, wherein the platinum catalyst includes at least one compound of the group consisting of platinum alcoholate and siloxane platinate.

7. The self-fusing conductive silicone rubber composition according to claim 1, wherein the organic peroxide includes at least one compound of the group consisting of bis-2,4-dichlorobenzoylperoxide, t-butylperbenzoate, di-t-butylbenzoylperoxide, 2,5-dimethyl, 2,5-di-tertiary-butylperoxide and ortho-chloroperbenzoate.

8. The self-fusing conductive silicone rubber composition according to claim 1, wherein the carbon black includes at least one material of the group consisting of acetylene black, oil furnace black and thermal black.

9. The self-fusing conductive silicone rubber composition according to claim 1, wherein the metal powder includes at least one powder of the group consisting of silver, nickel, copper, aluminium and stainless steel powder, and powder made conductive by applying metal plating to non-conductive particles.

10. The self-fusing conductive silicone rubber composition according to claim 1, wherein the additive containing boron includes at least one compound of the group consisting of trialkoxy boron ($B(RO)_3$, wherein the R represents an alkyl group with 1–20 carbon atoms and trialkyl boron ($BR_3$, wherein the R represents an alkyl group with 1–20 carbon atoms).

* * * * *